April 11, 1961 L. PERRAULT 2,979,431
METHOD AND APPARATUS OF PRODUCING RE-ENFORCED
THERMOPLASTIC BODIES
Filed March 14, 1956 3 Sheets-Sheet 1
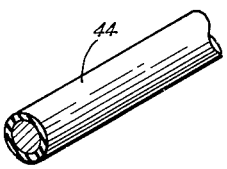
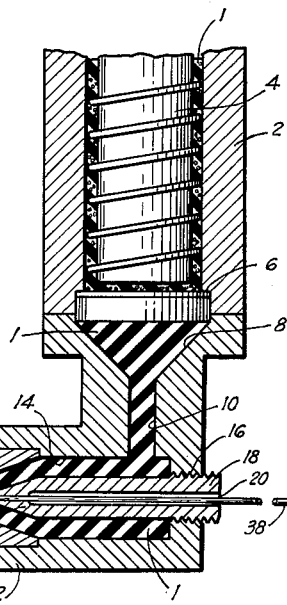
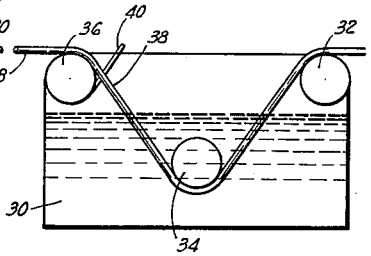
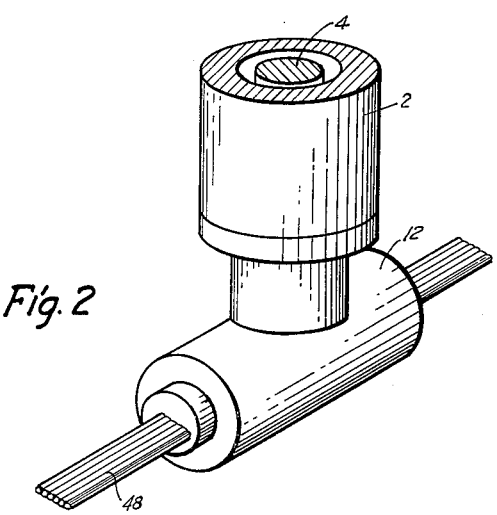
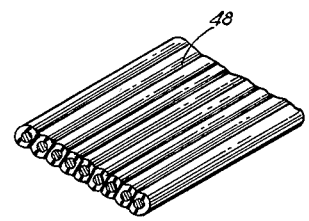
INVENTOR.
Lewis Perrault April 11, 1961 L. PERRAULT 2,979,431
METHOD AND APPARATUS OF PRODUCING RE-ENFORCED
THERMOPLASTIC BODIES
Filed March 14, 1956 3 Sheets-Sheet 2

INVENTOR.
Lewis Perrault
BY
ATTORNEY

April 11, 1961 L. PERRAULT 2,979,431
METHOD AND APPARATUS OF PRODUCING RE-ENFORCED
THERMOPLASTIC BODIES
Filed March 14, 1956 3 Sheets-Sheet 3

INVENTOR.
Lewis Perrault
BY
ATTORNEY

United States Patent Office 2,979,431
Patented Apr. 11, 1961

2,979,431
METHOD AND APPARATUS OF PRODUCING RE-ENFORCED THERMOPLASTIC BODIES

Lewis Perrault, Tulsa, Okla., assignor to Ralph T. Hays, Tulsa, Okla., trustee

Filed Mar. 14, 1956, Ser. No. 571,498

4 Claims. (Cl. 154—2.24)

This invention relates to improvements in the method of treating plastic compositions including compositions having a filler and an organic binder and more particularly, but not by way of limitation, to a method and manufacture for producing re-enforced thermoplastic bodies.

Many attempts have been made to incorporate long fibers in thermoplastic compositions, however, the high viscosity of the thermoplastic mass is such to prevent the fibers from being efficiently embedded and surrounded by the thermoplastic mass. As a consequence, the structure is very weak in the shear factor between the laminations, particularly since the re-enforced fibers are not protected from moisture and other climatic conditions entering the mass where the re-enforced fibers are located, such is a limitation on the amount of fiber re-enforcement. Thermoplastics on the market today usually range in tensile strength from two thousand pounds per square inch to approximately six thousand pounds per square inch. However, due to creep of the composition material, only about fifteen or twenty percent of the tensile strength can be utilized for resisting long term stresses. Thermo-setting plastics are preferably re-enforced with fibers of high tensile strength, and similarly it is desirable to re-enforce thermoplastics with fibers of high tensile strength, and the re-enforcing fibers are placed in a definite pattern in order to directly resist the tension stresses. In this manner the useful operating strengths of the reenforced material can be extended from a low fifteen or twenty percent tensile strength to a range of approximately eighty percent or more of tensile strength.

Present day re-enforced structures usually involve open weave or braided re-enforcing cloth which is laminated between sheets or layers of thermoplastics. Pressure and heat through any suitable treating apparatus are applied to the laminated composition to press and force the sheet faces for bonding them to each other through the mesh openings of the weave or braids. Another system for re-enforcement is utilizing a plastisol dip applied to woven goods which is subsequently disposed between thermoplastic sheets with an application of heat or pressure to bond the materials together in a laminated structure. Many variations of the above methods have been used, but without too great success because of the limited re-enforcement aspects as well as the weakness of shear planes in the laminations, and substantially little or no protection for the re-enforcing fibers in the laminated structures. With an efficient application of viscosity and adhesion many of the present day difficulties in re-enforced thermoplastics may be overcome. A successful or efficient re-enforced laminated structure may be formed from a series of sound continuous glue lines between the re-enforcing fibers, and the more viscous the adhering glue, the more difficult it is to provide a more even distribution of the glue and the setting of the glued surface for bonding.

The present invention is generally concerned with the re-enforcement of thermoplastic bodies with variable types of fibers or wire which can be bonded together by heat and pressure to provide a laminated structure of high tensile strength. The re-enforced structure may be extruded into long single end rods or tape shapes for interweaving with a similar body of re-enforced thermoplastic for providing a re-enforced laminated structure. The invention contemplates utilizing to an advantage the principles that thermoplastic bodies may be bonded together by heat and pressure, and furthermore that thermoplastics may be extruded into long rods, tapes or tubes wherein an extruded coating or covering of thermoplastics may be disposed over a wire or other suitable fibers which have been pre-dipped with a thermosetting resin having suitable bonding characteristics to provide sufficient adhesion between the thermoplastic covering and the dipped fibers.

It is an important object of this invention to provide an efficient process for the production of molded bodies comprising a re-enforcing filler and a thermoplastic body wherein the tensile strength of the end product is increased materially.

A further object of this invention is to form a re-enforced thermoplastic body which eliminates any voids or inconsistencies in the homogeneous mass particularly between the re-enforced filler material and the organic thermoplastic binder.

And still another object of this invention is to provide a re-enforced thermoplastic body which is substantially creep proof and capable of being formed into a plurality of shapes suitable for maintaining and holding fluids or fluid-solid bodies under pressure at stresses four or five times greater than the tensile strength of the unre-enforced structure.

And still another object of this invention is to produce a re-enforced thermoplastic wherein the re-enforcing material is distributed uniformly in a pre-formed geometric pattern permitting uniform and even distribution of the thermoplastic material therebetween for increasing the tensile strength of the end product.

And still another object of this invention is to produce a re-enforced thermoplastic laminated body including an evenly distributed re-enforcing material therein for substantially overcoming any weakness of shear planes in the laminations to enhance the tensile strength thereof and thus increase the adaptability of the laminated material for uses not heretofore known.

Another object of this invention is to provide a simple and efficient process for the production of re-enforced thermoplastic bodies for obtaining the aforementioned desirable results.

Other objects and advantages of the invention will be evident from the following detailed description, read in conjunction with the accompanying drawings, which illustrate my invention.

In the drawings:

Figure 1 is a vertical sectional view diagrammatically illustrating an apparatus for carrying out my improved process.

Figure 2 is a perspective view showing a portion of the apparatus used in Fig. 1 for a slightly modified form of re-enforced body.

Figure 3 is a perspective view showing a single end fiber body.

Figure 4 is a view similar to Fig. 3 showing a tape body of coated wire or fibers.

Figures 5 to 9, inclusive, are perspective views of various patterns of weaving or lay-ups for the re-enforced thermoplastic bodies.

Figure 10:
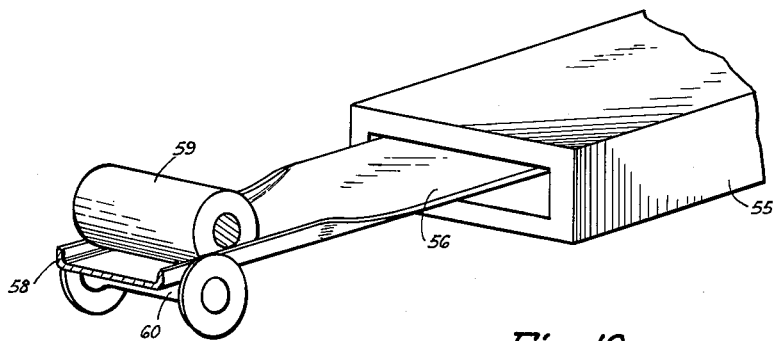

Figure 10 is a perspective view showing a schematic arrangement of a heating oven and forming rolls for the laminated structure.

Figure 11:
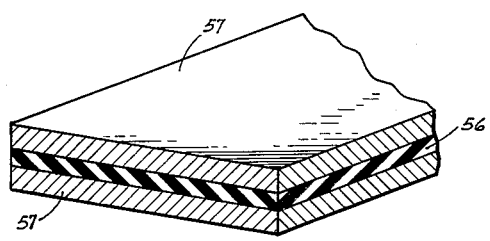

Figure 11 is a perspective view partly in section showing a pressing mold for the laminations.

Figure 12:
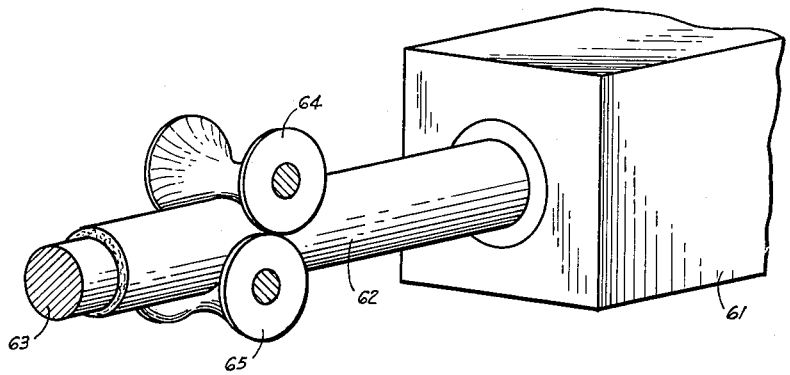

Figure 12 is a view similar to Fig. 10 showing different types of forming rolls.

Figure 13:
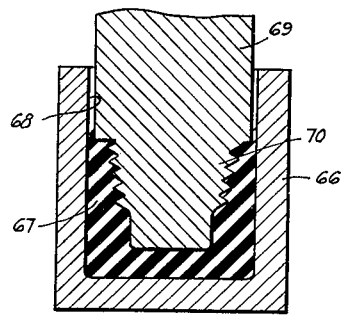

Figure 13 is a sectional elevational view of a die forming unit.

Referring to the drawings in detail, the thermoplastic material which may be utilized is any suitable type of poly-vinyl chloride, polystyrene, acetate butyrate or polyethylene, but it is to be specifically understood that the process is not limited to the use of such material. The thermoplastic 1 is usually in the form of small pellets or granules and placed in a hopper (not shown) for discharge in any suitable manner to an extruding apparatus 2 where the granules are heated (not shown) and subsequently broken up by a screw or spiral member 4 which is rotatably mounted for cooperation with the extruding housing 2 in a manner which is well known in the art. It will be apparent that the screw shaft 4 is connected with suitable driving means (not shown) for continuous rotation in the extruder whereby the thermoplastic granules are kneaded or worked to be discharged through the perforated breaker plate 6 providing back pressure against the screw member 4 and having perforations (not shown) of a size to assure that any unmelted granules are stopped thereby. In this manner the thermoplastic granules are transformed into an integral and homogeneous plastic mass of uniform consistency for discharge through a funnel shaped recess 8 communicating with a vertical bore 10 in the extruder apparatus 2.

The thermoplastic composition is then permitted to flow into a lower guide housing 12 having an elongated receiving chamber 14 therein communicating with the bore 10. The housing 12 is threaded at 16 for threadedly receiving a cross head wire coater 18 having a central bore 20 for a purpose as will be hereinafter set forth. The cross head 18 extends transversely into the chamber 14 and is provided with a nozzle or pointed nose portion 22 extending into a cone or funnel portion 25 provided by a removable nozzle 26 in the usual manner. The nozzle 26 is removably secured by a suitable holding element 28.

In this first stage operation of re-enforcing the thermoplastic composition a dip tank 30 is disposed substantially adjacent the guide member 12 and is provided with a plurality of transversely disposed rolls 32, 34 and 36 suitably supported in the dip tank, and through which is fed the re-enforcing fiber or wire 38 from a source of supply (not shown). The re-enforcing wire or fiber is fed from a top position on roll 32 to beneath the roll 34 where it is immersed or dipped in a catalyzed glue or resin, but not limited thereo. From the lower roll 34 the fiber or wire passes through a squeegee device 40 for removal of excess resin or glue therefrom, after which it passes around the roll 36 to be fed into the aperture 20 of the cross head 18. As the resin dipped wire or fiber 38 passes from the nozzle 22 it comes in contact with the homogeneous mass of thermoplastic 1 provided in the chamber 14 and particularly in the funnel shaped portion 24 of the nozzle 26 so that the wire 38 is completely covered with the thermoplastic material prior to extrusion from the aperture 42 of the nozzle 26. The re-enforced thermoplastic fiber wire 44 is then fed to the receiving roll 46.

In Fig. 2 is shown a similar apparatus in perspective elevation showing a method of processing the re-enforced thermoplastic in tape form such as shown at 48 in Fig. 4 in lieu of the end form as shown in Fig. 3. It will be apparent that extruding the thermoplastic cover over the fiber or wire re-enforcing whether it be in single end wires, or in tape form provides for an even distribution of the thermoplastic for the finished product of the re-enforced fibers or wires so that they may be suitably wound or assembled in finished form for subsequent operations.

The re-enforcing structure may be a fine material wire, asbestos, or single thread glass fibers, but is in no manner limited thereto. The resin utilized in the dip tank 30 may be any low viscosity thermosetting resin capable of bonding the thermoplastic to the re-enforcing structure and usually a resin having viscosity of 2500 centipoises or less and characterized by having a low shrink cure, long pot life after being catalyzed, such as twenty-four hours or longer, and also a high curing temperature of usually about 200 degrees Fahrenheit. The thermosetting resin is preferably one that will have efficient impregnation into a bundle of very fine filaments, and it should not be cross linked by the heat of the extrusion while going through the extrusion head, yet must jell to a flexible mass that will not drain away through a cut end. Furthermore, in final form it becomes inherently rigid. During the curing operation, the shrinkage of the thermosetting resin must be of a low order, and no volatiles must be given off during the cure which normally would interfere with adhesion and impregnation. In the first stage operation in order to overcome many of the deficiencies of re-enforced bodies, the fibers or wires are resin treated to bond to the thermoplastic covering material. However, due to a limited heat application during the extrusion of the thermoplastic material, the resins are not thermoset but are retained in the core with the fiber. Furthermore, extruding the thermoplastic 1 over the dip coated fiber or wire thus provides for an even distribution of the thermoplastic mass on the finished product.

The process contemplates a second stage step of assembling the thermoplastic coated re-enforcing fibers or wires in a pattern most suitable to resist tension stresses of the finished product. Various patterns of weaving, binding or lay-ups are used to create a geometric pattern most suitable for the fibers to resist tension loads. In providing these patterns, either the tape or the single end coated bodies may be used, and Figs. 5 to 9, inclusive, illustrate various types of patterns or lay-ups that are suitable.

Figure 5:
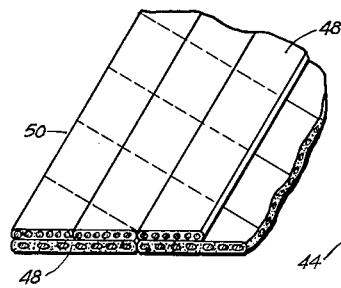
Figure 6:
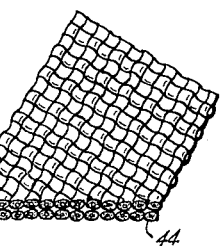
Figure 7:
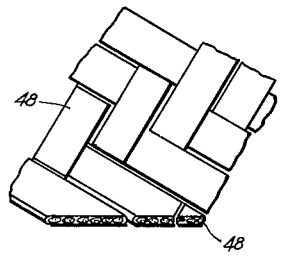
Figure 8:
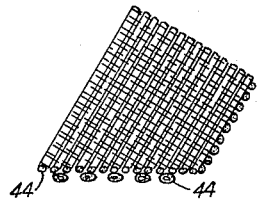
Figure 9:
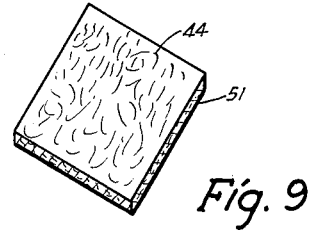

In Fig. 5 is shown a lay-up of super-imposed tape bodies 48 of the type disclosed in Fig. 4 which are disposed perpendicular to each other to provide a pattern 50 very suitable for bonding by subsequent heating and pressure. The pattern shown in Fig. 6 is an overlap of single end material 44 such as that depicted in Fig. 3. In Fig. 7 is depicted a lay-up or weave similar to Fig. 5 wherein a tape 48 is utilized, and is super-imposed in the pattern as shown. Figure 8 shows a pattern similar to Fig. 6 utilizing single end bodies 44 which are overlapped for a plain weave, and is very suitable for subsequent production of tubular bodies or the like. Figure 9 discloses a re-enforced body 51 utilizing single end fibers 44 such as in Fig. 3, and disposed at random as distinguished from a geometric pattern. The assembly of the coated re-enforced body such as shown in Fig. 3 or Fig. 4 into any of the aforementioned patterns provides a pattern which is most suitable to resist tension stresses in a subsequent end product, and any suitable type of pattern may be utilized as desired, depending upon the type of end product required. Of course, the patterns may be varied and interlinked with each other as desired, and the invention is not limited to any particular type of pattern, but merely the utilization of a suitable pattern for the resisting of tension stresses.

In joining the surfaces or laminating any of the varous reenforced patterns into one mass, it is desirable to apply heat and pressure as is well known in the industry. The application of heat and pressure will thermoset the resin of the re-enforcing fibers to provide an end product with an even and controlled distribution of re-enforcement in the thermoplastic mass. Furthermore, the thermoplastic mass is evenly distributed between the re-enforcing fibers or wire. The fibers or elongated wires are also bonded with the thermoplastic mass without any voids or spaces between the two bodies filled with the thermosetting resin.

In Figs. 10 to 13, inclusive, is illustrated various methods of forming the re-enforced product into various types of bodies. In Fig. 10 is disclosed a heating oven 55 through which passes any suitable pattern of the re-enforced material, which pattern may be formed from either single end 44 or tape 48, and is designated 56. Figure 11 depicts a mold or platen 57 which is heated in a manner (not shown) for the application of heat and pressure to press a suitable lay-up or weave 56 into a flat sheet for any desired subsequent formation. Alluding further to Fig. 10, the lay-up 56 upon discharge from the oven 55 may be formed with end flanges or the like 58 by suitable upper forming rolls 59 and lower forming rolls 60 as shown.

Figure 12 shows a modification of a heating oven 61 for the compression and forming of tubular lay-ups 62 in which is provided a round core 63, which cooperates with an upper forming roll 64, and lower forming roll 65 for forming the cylindrical end product.

Figure 13 depicts another form of compression in forming the re-enforced themoplastic bodies wherein a heated mold 66 is adapted to receive a re-enforced thermoplastic body 67 in the mold recess 68. The re-enforced thermoplastic body is usually preformed prior to reception in the mold recess 68. A suitable female mold member 69, which is preferably heated (not shown), is disposed in the recess 68 to apply pressure to the re-enforced thermoplastic body 67. The upper mold 69 may be provided with threads 70 for forming threads on the body 67. It will be apparent that the finished product 67 may be a female pipe cap utilized with a complementary end pipe (not shown) for closing.

From the foregoing, it will be apparent that the present invention provides a process of forming re-enforced thermoplastics wherein the re-enforcing fillers are pre-dipped with a thermosetting resin prior to becoming embedded in the plastic and the resin coated fibers are then coated simultaneously with the extrusion of a thermoplastic body wherein the thermoplastic mass is distributed uniformly and evenly therearound for an efficient end product. Furthermore, the resin treated re-enforcing materials are adapted to bond with the thermo-plastic covering material in a manner so that the resins are not initially thermoset due to the limited heat application, but are retained in the cores of the re-enforcing fibers in order to fill any voids and spaces thereby decreasing the shear factor in the laminated thermoplastic bodies, with a subsequent thermosetting thereof to provide an increased tensile strength of the finished body. The re-enforced bodies are preferably formed in a pattern prior to complete lamination for increasing the overall tensile strength of the finished product.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. The process of forming re-enforced thermoplastic bodies which consists of kneading heated thermoplastic granules into a thermoplastic mass, simultaneously dipping an elongated filler with a thermosetting resin characterized by providing a low order shrinkage during curing to preclude discharge of volatiles, and impregnating the voids between the filler with the thermosetting resin, feeding the impregnated filler into contact with the thermoplastic mass for bonding the thermoplastic mass with the filler, uniformly impregnating the thermoplastic around the resin dipped filler as the filler is fed into contact with the mass, extruding the re-enforced thermoplastic through a constricted orifice, forming the extruded re-enforced thermoplastic mass and laminating the re-enforced patterns by heating and compression to complete the final thermosetting of the resin to provide a re-enforced body of high tensile strength.

2. The process of forming re-enforced thermoplastic bodies which consists of kneading heated thermoplastic granules into a thermoplastic mass, simultaneously dipping an elongated continuous line of fibers with a thermosetting resin characterized by providing a low order shrinkage during curing to preclude discharge of volatiles, and impregnating the voids between the fibers with the thermosetting resin, feeding the fibers into contact with the thermoplastic mass for bonding the thermoplastic to the fibers, uniformly impregnating the thermoplastic around the resin dipped fibers as the fibers are fed into contact with the mass, extruding the re-enforced thermoplastic through a constricted orifice, forming an interwoven pattern by super-imposing the extrusions of the re-enforced thermoplastic mass, laminating the superimposed patterns by heating and compression to provide a re-enforced body of high tensile strength.

3. In a method of forming re-enforced thermoplastic tubular bodies which consists of transforming thermoplastic granules into a homogeneous thermoplastic mass for discharge into a chamber, directing the flow of the thermoplastic mass into the chamber in a plurality of spaced layers, simultaneously dipping a re-enforcing fiber with a thermosetting resin and feeding the glue dipped fiber into contact with the thermoplastic mass between the layers thereof in the chamber for bonding the thermoplastic to the fiber, uniformly covering the resin dipped fiber with the thermoplastic mass as it is fed into contact therewith, maintaining the resin in a partially thermoset condition in the core of the fibers for filling the voids and spaces in the thermoplastic mass thereby assisting the bonding of the thermoplastic mass and the resin dipped fiber during the initial contact therewith, extruding the fiber re-enforced thermoplastic through a constricted orifice to provide a re-enforced thermoplastic tubular body of high tensile strength.

4. In a method of forming re-enforced thermoplastic tubular bodies which consists of transforming thermoplastic granules into a homogeneous thermoplastic mass for discharge into a chamber, directing the flow of the thermoplastic mass into the chamber in a plurality of spaced layers, simultaneously dipping a re-enforcing fiber with a thermosetting resin and feeding the resin dipped fiber into contact with the thermoplastic mass between the layers thereof in the chamber for bonding the thermoplastic to the fiber, uniformly covering the resin dipped fiber with the thermoplastic mass as it is fed into contact therewith, maintaining the resin in a partially thermoset condition in the cores of the fibers for filling the voids and spaces in the thermoplastic mass thereby assisting the bonding of the thermoplastic mass and the resin dipped fiber during the initial contact therewith, extruding the fiber re-enforced thermo-plastic through a constricted orifice, forming an interwoven pattern of the fiber re-enforced thermoplastic mass, and laminating a plurality of the patterns by heating and compression to complete the thermosetting of the resin and provide a re-enforced tubular body of high tensile strength.

References Cited in the file of this patent

UNITED STATES PATENTS

| | | |
|---|---|---|
| 1,802,605 | Kemp | Apr. 28, 1931 |
| 1,914,097 | Barker | June 13, 1933 |
| 2,332,233 | Katz | Oct. 19, 1943 |
| 2,344,457 | Christ | Mar. 14, 1944 |
| 2,361,374 | Abbott | Oct. 31, 1944 |
| 2,427,196 | Cox | Sept. 9, 1947 |
| 2,438,956 | Warner | Apr. 6, 1948 |
| 2,471,752 | Ingmanson | May 31, 1949 |
| 2,668,987 | Harris | Feb. 16, 1954 |
| 2,669,754 | Chadbourne | Feb. 23, 1954 |
| 2,749,261 | Hardison | June 5, 1956 |
| 2,827,413 | Friedmann | Mar. 18, 1958 |
| 2,851,515 | Kolmorgen | Sept. 8, 1958 |